US012675128B2

(12) United States Patent
Hao et al.

(10) Patent No.: US 12,675,128 B2
(45) Date of Patent: Jul. 7, 2026

(54) OPTICAL COMPUTING APPARATUS AND METHOD

(71) Applicant: HUAWEI TECHNOLOGIES CO., LTD., Shenzhen (CN)

(72) Inventors: Ran Hao, Hangzhou (CN); Huaqing Jiang, Hangzhou (CN); Jianjun He, Hangzhou (CN); Chong Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 282 days.

(21) Appl. No.: 18/523,760

(22) Filed: Nov. 29, 2023

(65) Prior Publication Data

US 2024/0111325 A1 Apr. 4, 2024

Related U.S. Application Data

(63) Continuation of application No. PCT/CN2022/095297, filed on May 26, 2022.

(30) Foreign Application Priority Data

May 31, 2021 (CN) ........................ 202110601682.1

(51) Int. Cl.
*G06E 1/02* (2006.01)

(52) U.S. Cl.
CPC ...................................... *G06E 1/02* (2013.01)

(58) Field of Classification Search
CPC ........... G06E 1/02; G06E 3/003; G06E 3/005; G02F 1/225; G06F 17/14; G06F 17/16
See application file for complete search history.

(56) References Cited

U.S. PATENT DOCUMENTS 11,200,487 B1 * 12/2021 Grundmann .............. G02F 1/35

FOREIGN PATENT DOCUMENTS

| | | | |
|---|---|---|---|
| CN | 105467806 | A | 4/2016 |
| CN | 110702230 | A | 1/2020 |
| CN | 112783260 | A | 5/2021 |

(Continued)

OTHER PUBLICATIONS

Rhody Harvey: "Lecture 12: Image Processing and 2D Transforms", Oct. 18, 2005, total 26 pages.

(Continued)

*Primary Examiner* — Charles S Chang

(57) ABSTRACT

This application discloses an optical computing apparatus and method, and relates to the field of optical processing technologies. The apparatus implements two-dimensional Fourier transform of input data. The apparatus includes a beam splitting phase shift module and a beam combination module. The beam splitting phase shift module is configured to receive a plurality of input optical signals that indicate input data, and output a plurality of groups of intermediate optical signals based on the plurality of input optical signals. The beam combination module is configured to obtain a plurality of output optical signals based on the plurality of groups of intermediate optical signals, where output data indicated by the plurality of output optical signals is data obtained through two-dimensional Fourier transform performed on the input data.

10 Claims, 9 Drawing Sheets

(56) References Cited

FOREIGN PATENT DOCUMENTS

| | | |
|---|---|---|
| CN | 112857570 A | 5/2021 |
| CN | 113009801 A | 6/2021 |

OTHER PUBLICATIONS

K. Liao et al,"AI-assisted on-chip nanophotonic convolver based on silicon metasurface", Nanophotonics, (2020), total 8 pages.

P.-I. Dietric et al:"In-Situ 3D Nano-Printing of Freeform Coupling Elements for Hybrid Photonic Integration", Jun. 18, 2017, total 12 pages.

Moustafa Ahmed et al."Integrated photonic FFT for photonic tensor operations towards efficient and high-speed neural networks",vol. 9,No. 13,ISSN:2192-8606,Jun. 26, 2020,XP093153868,total 12 pages.

* cited by examiner

OPTICAL COMPUTING APPARATUS AND METHOD

CROSS-REFERENCE TO RELATED APPLICATIONS

This application is a continuation of International Application No. PCT/CN2022/095297, filed on May 26, 2022, which claims priority to Chinese Patent Application No. 202110601682.1, filed on May 31, 2021. The disclosures of the aforementioned applications are hereby incorporated by reference in their entireties.

TECHNICAL FIELD

This application relates to the field of optical processing technologies, and in particular, to an optical computing apparatus and method.

BACKGROUND

Nowadays, technologies for high-speed intelligent processing of image and video data are widely required, which poses a great challenge to photoelectric hybrid artificial intelligence (AI) chip technologies. An important technical requirement thereof is to perform two-dimensional Fourier transform on two-dimensional data of an image and a video by using a photoelectric hybrid AI chip, to extract a feature of the image or an image frame in the video.

In Fourier optics, a lens has a property of two-dimensional Fourier transform. Therefore, usually, a stereo-structured lens may be used for implementing two-dimensional Fourier transform in three-dimensional space. However, because a photoelectric hybrid AI chip is limited by a planar process, only one-dimensional Fourier transform on a chip can be implemented based on a current planar production process of a photoelectric hybrid AI chip, and a stereo-structured lens for implementing two-dimensional Fourier transform cannot be fabricated on a chip.

Therefore, how to implement two-dimensional Fourier transform of data on a photoelectric hybrid AI chip is a technical problem that urgently needs to be resolved currently.

SUMMARY

This application provides an optical computing apparatus and method, so as to implement two-dimensional Fourier transform of input data.

To achieve the foregoing objective, this application provides the following technical solutions.

According to a first aspect, this application provides an optical computing apparatus. The apparatus includes: a beam splitting phase shift module, configured to receive a plurality of input optical signals that indicate input data, and output a plurality of groups of intermediate optical signals based on the plurality of input optical signals; and a beam combination module, configured to receive the plurality of groups of intermediate optical signals, and obtain a plurality of output optical signals based on the plurality of groups of intermediate optical signals, where output data indicated by the plurality of output optical signals is data obtained through two-dimensional Fourier transform performed on the input data.

Each input optical signal is used to obtain one group of intermediate optical signals in the plurality of groups of intermediate optical signals, and one of the plurality of input optical signals indicates one element in the input data that includes a plurality of elements. Each of the plurality of output optical signals includes one intermediate optical signal in each of the plurality of groups of intermediate optical signals.

It can be learned that, because all of a signal input to the optical computing apparatus, a signal processed in the optical computing apparatus, and a signal output by the optical computing apparatus are optical signals, compared with a two-dimensional Fourier transform process implemented based on electrical computing, two-dimensional Fourier transform of data implemented by the optical computing apparatus provided in this application is characterized by high efficiency and a low delay.

In addition, the optical computing apparatus provided in this application may be disposed on an optical chip through a planar production process. In this way, an optical chip provided with the optical computing apparatus provided in this application can implement two-dimensional Fourier transform of data with high efficiency and a low delay. Compared with implementing two-dimensional Fourier transform of data by using a lens, an optical chip provided with the optical computing apparatus provided in this application is characterized by a compact structure and a small volume, and therefore is convenient for integration application.

In a design, the input data includes two-dimensional data. Through this design, according to this embodiment of this application, two-dimensional Fourier transform is performed on the two-dimensional data in an optical-in optical-out manner, thereby improving efficiency of performing two-dimensional Fourier transform on the data.

In another design, the beam splitting phase shift module includes a plurality of beam splitting phase shifters, and each of the plurality of beam splitting phase shifters is configured to receive one input optical signal, and output one group of intermediate optical signals in the plurality of groups of intermediate optical signals based on the received input optical signal. Each beam splitting phase shifter includes a plurality of output ports, and each of the plurality of output ports is configured to output one intermediate optical signal. The beam combination module is configured to receive the plurality of groups of intermediate optical signals from the plurality of beam splitting phase shifters, and combine intermediate optical signals output from output ports with a same port number in the plurality of beam splitting phase shifters into one output optical signal, to obtain the plurality of output optical signals.

In another design, each of the plurality of beam splitting phase shifters is configured to receive one input optical signal, split the received input optical signal into one group of optical sub-signals, and adjust a phase of each optical sub-signal in the group of optical sub-signals, to obtain the group of intermediate optical signals.

In another design, each beam splitting phase shifter includes a beam splitter and a plurality of phase shifters. The beam splitter is configured to split the received input optical signal into the group of optical sub-signals. The plurality of phase shifters are configured to adjust the phase of each optical sub-signal in the group of optical sub-signals, to obtain the group of intermediate optical signals.

In another design, a phase offset used for phase adjustment of the optical sub-signal by each of the plurality of phase shifters satisfies a formula $\psi(x,y,u,v)=\exp(i\cdot 2\pi(ux/m+vy/n))$, where $\psi$ represents the phase offset, a combination of x and y represents a number of the beam splitting phase shifter, numbers of the plurality of beam splitting phase shifters correspond to location numbers of a plurality of elements in the two-dimensional data, a combination of u and v represents a port number of an output port of the beam splitting phase shifter, each of the plurality of beam splitting phase shifters includes a plurality of output ports, values of x and u are integers in a range [1, m], values of y and v are integers in a range [1, n], both m and n are positive integers greater than 1, and i is an imaginary number symbol.

Based on the foregoing implementations, the input optical signals are processed by using the beam splitting phase shift module and the beam combination module, to output the output optical signals that indicate the output data obtained through two-dimensional Fourier transform of the input data. This is equivalent to implementing a process of performing two-dimensional Fourier transform on the data in an optical computing manner. In this way, compared with implementing two-dimensional Fourier transform of data through electrical computing, the optical computing apparatus provided in this application can implement two-dimensional Fourier transform of the input data with high efficiency and a low delay by performing optical processing on the input optical signals that indicate the input data.

In another design, the beam splitter includes any one of an optical waveguide furcation structure, a grating structure, or a directional coupler structure.

In another design, each of the plurality of phase shifters includes a waveguide.

In another design, the beam combination module includes a three-dimensional waveguide connection structure or a waveguide network on a two-dimensional plane, and a connection at a crosspoint of waveguides in the waveguide network is implemented by using a coupler.

In another design, each of the plurality of beam splitting phase shifters includes a diffraction structure, and a structural parameter of the diffraction structure is obtained through iterative training of a simulation system.

Usually, the optical waveguide furcation structure, the grating structure, the directional coupler structure, the waveguide, the diffraction structure, and the like in the foregoing several designs may all be structures fabricated on an optical chip. In this way, the apparatus provided in this application can implement two-dimensional Fourier transform of the data by using an on-chip structure on an optical chip, thereby filling a technical gap in performing two-dimensional Fourier transform on data based on an on-chip structure.

According to a second aspect, this application provides an optical computing method. The method is used to perform two-dimensional Fourier transform on data. The method includes: receiving a plurality of input optical signals that indicate input data, outputting a plurality of groups of intermediate optical signals based on the plurality of input optical signals, and obtaining a plurality of output optical signals based on the plurality of groups of intermediate optical signals, where output data indicated by the plurality of output optical signals is data obtained through two-dimensional Fourier transform performed on the input data. Each input optical signal is used to obtain one group of intermediate optical signals in the plurality of groups of intermediate optical signals, and one of the plurality of input optical signals indicates one element in the input data that includes a plurality of elements. Each of the plurality of output optical signals includes one intermediate optical signal in each of the plurality of groups of intermediate optical signals.

In a design, the input data includes two-dimensional data.

In another design, the outputting a plurality of groups of intermediate optical signals based on the plurality of input optical signals includes: outputting one group of intermediate optical signals in the plurality of groups of intermediate optical signals based on each of the plurality of input optical signals; and the obtaining a plurality of output optical signals based on the plurality of groups of intermediate optical signals includes: combining intermediate optical signals output from output ports with a same port number into one output optical signal, to obtain the plurality of output optical signals.

In another design, the outputting one group of intermediate optical signals in the plurality of groups of intermediate optical signals based on each of the plurality of input optical signals includes: splitting each received input optical signal into one group of optical sub-signals, and adjusting a phase of each optical sub-signal in the group of optical sub-signals, to obtain the group of intermediate optical signals.

In another design, a phase offset used for phase adjustment of each optical sub-signal in the group of optical sub-signals satisfies $\psi(x,y,u,v)=\exp(i\cdot 2\pi(ux/m+vy/n))$, where $\psi$ represents the phase offset, a combination of x and y represents a number of an element in the two-dimensional data, a combination of u and v represents a port number of an output port configured to output the intermediate optical signal, values of x and u are integers in a range [1, m], values of y and v are integers in a range [1, n], both m and n are positive integers greater than 1, and i is an imaginary number symbol.

It should be understood that, for beneficial effects brought by any one of the second aspect or the designs of the second aspect, reference may be made to beneficial effects of the solution in any one of the first aspect or the designs of the first aspect. Details are not described herein again.

According to a third aspect, this application provides an optical chip. The optical computing apparatus according to any one of the first aspect or the designs of the first aspect is deployed on the optical chip.

It can be understood that any apparatus, optical chip, or the like provided above may be applied to the corresponding method provided above. Therefore, for beneficial effects that can be achieved by the apparatus, the optical chip, or the like, reference may be made to beneficial effects in the corresponding method. Details are not described herein again.

DESCRIPTION OF EMBODIMENTS

Figure 1A:
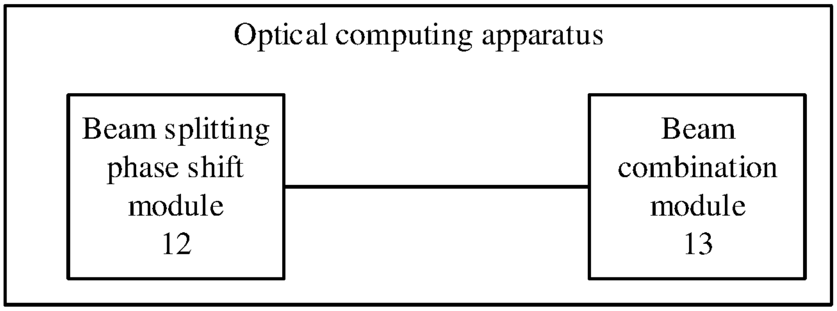
FIG. 1*a* is a diagram of a structure of an optical computing apparatus according to an embodiment of this application.

To understand embodiments of this application more clearly, the following describes some terms or technologies used in embodiments of this application.

(1) Two-Dimensional Fourier Transform

Fourier transform is a basic tool of many signal processing methods, and is widely applied. For example, a feature in an image can be extracted by performing two-dimensional Fourier transform on two-dimensional data of the image.

Usually, when Fourier transform of data is processed on a computer, discrete Fourier transform needs to be performed on the data. For two-dimensional Fourier transform, two-dimensional discrete Fourier transform may be defined according to the following formula (1):

$$B(u, v) = \sum_{x=1}^{M} \sum_{y=1}^{N} A(x, y) e^{-j2\pi(ux/M + vy/N)} \quad \text{Formula (1)}$$

Herein, A(x, y) is input two-dimensional data, namely, two-dimensional data on which two-dimensional Fourier transform is to be performed; and x and y are respectively sequence numbers of the input two-dimensional data in two directions (including a direction 1 and a direction 2) in a two-dimensional plane. A value of x is an integer in a range [1, M], and a value of y is an integer in a range [1, N]. Herein, both M and N are integers greater than or equal to 1, M is a quantity of values of x, and N is a quantity of values of y. It can be learned that a size of a matrix that represents the input two-dimensional data is M×N. j is an imaginary number symbol.

B(u, v) is output two-dimensional data, namely, two-dimensional data obtained through two-dimensional Fourier transform of the input two-dimensional data; and u and v are respectively sequence numbers in the two directions in the two-dimensional plane. In addition, a value of u is an integer in the range [1, M], and a value of v is an integer in the range [1, N]. It can be learned that sequence number value ranges of u and v are the same as those of x and y, a quantity of values of u is the same as that of x (namely, M), and a quantity of values of v is the same as that of y (namely, N). In other words, a size of a matrix that represents the two-dimensional data obtained through two-dimensional Fourier transform is M×N.

It can be learned that, before and after Fourier transform is performed on the two-dimensional data, the size of the matrix that represents the two-dimensional data does not change.

(2) Other Terms

In embodiments of this application, an expression such as "an example" or "for example" is used to represent giving an example, an illustration, or a description. Any embodiment or design solution described as "an example" or "for example" in embodiments of this application shall not be interpreted as being more preferred or advantageous than other embodiments or design solutions. To be precise, the expression such as "an example" or "for example" is intended to present a related concept in a same manner.

It should be understood that the terms used in the descriptions of the various examples in this specification are merely intended to describe examples, but are not intended to impose a limitation.

In embodiments of this application, the terms "first" and "second" are merely intended for a purpose of description, and shall not be understood as an indication or implication of relative importance or an implicit indication of a quantity of indicated technical features. Therefore, a feature modified by "first" or "second" may explicitly or implicitly include one or more features. In the descriptions of this application, unless otherwise specified, "a plurality of" means two or more.

It should be understood that, in embodiments of this application, sequence numbers of the processes do not indicate execution sequences. Execution sequences of the processes should be determined based on functions and internal logic of the processes, and shall not constitute any limitation on an implementation process of embodiments of this application.

It should be further understood that the term "include" (also referred to as "includes", "including", "comprises", and/or "comprising"), when being used in this specification, specifies the presence of stated features, integers, steps, operations, elements, and/or components, but does not exclude the presence or addition of one or more other features, integers, steps, operations, elements, components, and/or groups thereof.

It should be further understood that the term "if" may be interpreted as meaning "when" ("when" or "upon"), "in response to determining", or "in response to detecting". Similarly, based on the context, the phrase "if it is determined that" or "if (a stated condition or event) is detected" may be interpreted as meaning "when it is determined that", "in response to determining that", "when (a stated condition or event) is detected", or "in response to detecting (a stated condition or event)".

It should be understood that "one embodiment", "an embodiment", "an implementation", and the like mentioned throughout the specification mean that features, structures, or characteristics related to the embodiment or the implementation are included in at least one embodiment of this application. Therefore, "in one embodiment", "in an embodiment", "an implementation", or the like appearing throughout the specification does not necessarily refer to a same embodiment. In addition, these features, structures, or characteristics may be combined in one or more embodiments in any suitable manner.

Embodiments of this application provide an optical computing apparatus. The optical computing apparatus is configured to process a plurality of input optical signals that indicate input data, to output a plurality of output optical signals. Data indicated by the plurality of output optical signals is data obtained through two-dimensional Fourier transform performed on the input data. In other words, the optical computing apparatus implements two-dimensional Fourier transform of the input data.

FIG. 1*a* is a diagram of a structure of an optical computing apparatus according to an embodiment of this application. As shown in FIG. 1*a*, the optical computing apparatus includes a beam splitting phase shift module and a beam combination module, and the beam splitting phase shift module and the beam combination module are connected to each other by using a waveguide. For detailed descriptions of the beam splitting phase shift module and the beam combination module, refer to the following descriptions of a beam splitting phase shift module 12 and a beam combination module 13. Details are not described herein.

The optical computing apparatus may be an optical chip, or a functional module that is in an optical chip and that is configured to perform two-dimensional Fourier transform on input data. This is not limited in this embodiment of this application.

Embodiments of this application further provide a two-dimensional Fourier transform system. The two-dimensional Fourier transform system includes the foregoing optical computing apparatus, a preprocessing module, and a post processing module. For brevity of description, in embodiments of this application, the "two-dimensional Fourier transform system" is simply referred to as a "transform system" below.

The preprocessing module is configured to process input data (for example, to-be-transformed two-dimensional data) to obtain a plurality of input optical signals that indicate the input data. The post processing module is configured to process a plurality of output optical signals output by the optical computing apparatus, to obtain output data obtained through two-dimensional Fourier transform of the input data.

Figure 1B:
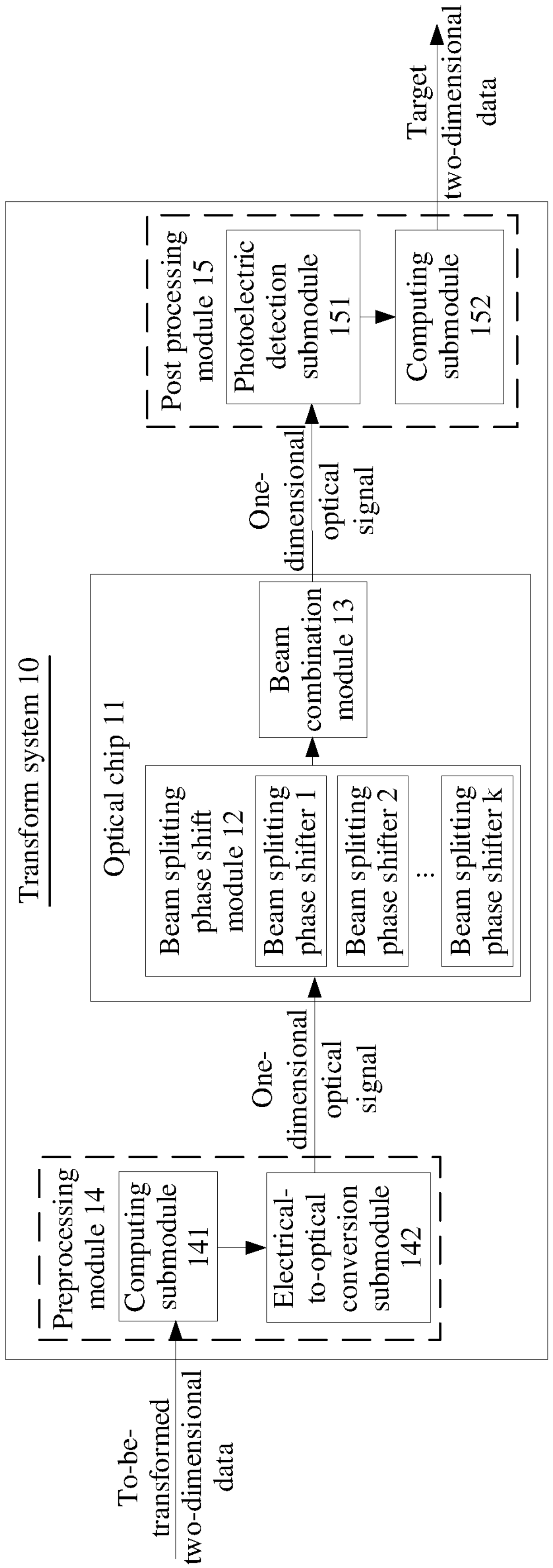
FIG. 1*b* is a diagram of a structure of a two-dimensional Fourier transform system according to an embodiment of this application.

The following uses an example in which the optical computing apparatus is an optical chip. FIG. 1*b* is a diagram of a structure of a two-dimensional Fourier transform system according to an embodiment of this application.

As shown in FIG. 1*b*, the transform system 10 includes a beam splitting phase shift module 12 and a beam combination module 13 that are deployed on an optical chip 11, and includes a preprocessing module 14 and a post processing module 15. The following describes structures of the beam splitting phase shift module 12, the beam combination module 13, the preprocessing module 14, and the post processing module 15 based on a sequence in which the modules in the transform system 10 perform steps in implementing the method provided in embodiments of this application.

The preprocessing module 14 includes a computing submodule 141 and an electrical-to-optical conversion submodule 142, and is configured to process input data (for example, to-be-transformed two-dimensional data) to obtain a plurality of optical signals that indicate the input data. Usually, the input data is to-be-transformed two-dimensional data. It can be understood that one piece of data in the to-be-transformed two-dimensional data is one element in the input data.

The computing submodule 141 may be configured to obtain the input data that includes a plurality of elements. For ease of description, in this embodiment of this application, an example in which the input data that includes the plurality of elements and that is obtained by the computing submodule 141 is to-be-transformed two-dimensional data that includes m×n pieces of data is used for description below, where both m and n are positive integers.

Optionally, the computing submodule 141 may expand the obtained to-be-transformed two-dimensional data that includes the m×n pieces of data into a group of one-dimensional data that includes k pieces of data, where k is a positive integer. It can be learned that an amount of data in a matrix corresponding to the to-be-transformed two-dimensional data is m×n, and m×n=k. For detailed descriptions of the expanding, by the computing submodule 141, the to-be-transformed two-dimensional data into the group of one-dimensional data that includes the k pieces of data, refer to the descriptions of the following method. Details are not described herein.

It should be understood that the computing submodule 141 may be any device, apparatus, or module that has a computing processing function. A form of the computing submodule 141 is not limited in this embodiment of this application.

For example, the computing submodule 141 may be a computing device such as a general-purpose computer device, a notebook computer, or a tablet computer. Alternatively, the computing submodule 141 may be one or more general-purpose central processing units (CPUs), or may be one or more other general purpose processors, digital signal processors (DSP), application-specific integrated circuits (ASIC), field-programmable gate arrays (FPGA) or other programmable logic devices, discrete gate or transistor logic devices, discrete hardware components, graphics processing units (GPU), neural network processing units (NPU), tensor processors (TPU), artificial intelligence (AI) chips, or the like.

The electrical-to-optical conversion submodule 142 may be configured to: generate, according to a predefined rule and based on the to-be-transformed two-dimensional data obtained by the computing submodule 141, k optical signals that indicate the to-be-transformed two-dimensional data, and output the k optical signals to the beam splitting phase shift module 12 in the optical chip 11. It should be understood that one of the k optical signals indicates one piece of data in the to-be-transformed two-dimensional data.

It should be understood that different data may be represented by using optical signals having different light intensity, or different data may be represented by using optical signals having different light spot shapes. This is not limited in this embodiment of this application.

In this case, the predefined rule may include correspondences between different light intensity of optical signals and data, or the predefined rule may include correspondences between different light spot shapes of optical signals and data. This is not limited in this embodiment of this application.

The following provides descriptions by using an example in which the predefined rule includes correspondences between different light intensity of optical signals and data.

Optionally, the electrical-to-optical conversion submodule 142 may be a light emitting array. In this case, light intensity of each point light source in the light emitting array is controlled based on the correspondences between different light intensity of optical signals and data in the predefined rule, so that the k optical signals in one-to-one correspondence with the k pieces of data in the to-be-transformed two-dimensional data can be generated.

Optionally, the electrical-to-optical conversion submodule 142 may alternatively be an optical modulator. In this case, the optical modulator modulates intensity of a background light field of a light source based on the correspondences between light intensity of optical signals and data in the predefined rule, so that the k optical signals in one-to-one correspondence with the k pieces of data in the to-be-transformed two-dimensional data can be obtained. The background light field may be a light field obtained after laser light generated by a laser is split by an optical splitting device. This is not limited in this embodiment of this application.

Optionally, the electrical-to-optical conversion submodule 142 may be alternatively configured to: generate, according to a predefined rule and based on the group of one-dimensional data that includes the k pieces of data and that is obtained by expanding the to-be-transformed two-dimensional data by the computing submodule 141, k optical signals that indicate the one-dimensional data, and output the k optical signals to the beam splitting phase shift module 12 in the optical chip 11. One of the k optical signals indicates one piece of data in the one-dimensional data.

It can be understood that the k optical signals generated by the electrical-to-optical conversion submodule 142 are one group of one-dimensional optical signals, that is, optical axes of the k optical signals are on a same plane. For example, the optical axes of the k optical signals are located in a plane of the optical chip 11.

The optical chip 11 may be an optical chip that includes only the beam splitting phase shift module 12 and the beam combination module 13. Certainly, in addition to the beam splitting phase shift module 12 and the beam combination module 13, the optical chip 11 may further include a component module configured to implement another function purpose. In this case, the beam splitting phase shift module 12 and the beam combination module 13 that are configured to implement the method provided in embodiments of this application are merely one functional unit of the optical chip 11.

The beam splitting phase shift module 12 deployed on the optical chip 11 includes a plurality of beam splitting phase shifters, and a quantity of the plurality of beam splitting phase shifters is greater than or equal to k.

It can be learned that the quantity of the beam splitting phase shifters included in the beam splitting phase shift module 12 is greater than or equal to the amount of data included in the to-be-transformed two-dimensional data described above. This is because the k optical signals corresponding to the one-dimensional data obtained by expanding the to-be-transformed two-dimensional data can be simultaneously processed only when the quantity of the beam splitting phase shifters in the beam splitting phase shift module 12 is greater than or equal to the amount of data included in the to-be-transformed two-dimensional data described above.

For ease of description, in this embodiment of this application, an example in which the quantity of the beam splitting phase shifters included in the beam splitting phase shift module 12 is equal to the amount of data included in the to-be-transformed two-dimensional data described above is used for description below. In this case, as shown in FIG. 1*b*, the beam splitting phase shift module 12 includes m×n (that is, k) beam splitting phase shifters, and the k beam splitting phase shifters are a beam splitting phase shifter 1, a beam splitting phase shifter 2, . . . , and a beam splitting phase shifter k that are shown in FIG. 1*b*.

Each of the k beam splitting phase shifters is configured to receive one optical signal generated by the electrical-to-optical conversion submodule 142, and process the received optical signal. In this way, the k beam splitting phase shifters are configured to receive the k optical signals generated by the electrical-to-optical conversion submodule 142, and process the received k optical signals.

For ease of description, in this embodiment of this application, the k optical signals received by the k beam splitting phase shifters in the beam splitting phase shift module 12 (that is, the k optical signals output by the electrical-to-optical conversion submodule 142) are referred to as k input optical signals below. In this case, each of the k beam splitting phase shifters is configured to receive one input optical signal. The k beam splitting phase shifters are configured to receive the k input optical signals.

Figure 2:
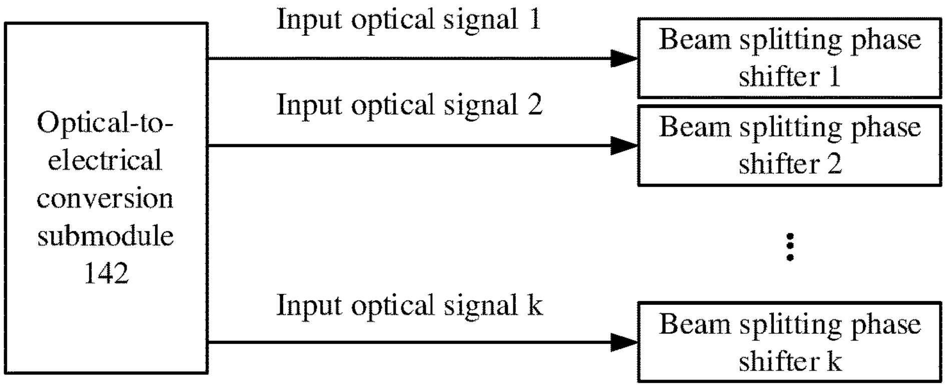
FIG. 2 is a diagram of receiving k input optical signals by k beam splitting phase shifters in a beam splitting phase shift module according to an embodiment of this application.

For example, FIG. 2 is a diagram of receiving the k input optical signals by the k beam splitting phase shifters in the beam splitting phase shift module 12.

As shown in FIG. 2, the k input optical signals that are generated by the electrical-to-optical conversion submodule 142 and that are used to be input to the k beam splitting phase shifters shown in FIG. 1*b* include an input optical signal 1, an input optical signal 2, . . . , and an input optical signal k. In this case, the beam splitting phase shifter 1 may be configured to receive the input optical signal 1, the beam splitting phase shifter 2 may be configured to receive the input optical signal 2, . . . , and the beam splitting phase shifter k may be configured to receive the input optical signal k.

Each of the k beam splitting phase shifters is configured to split one received input optical signal into one group of optical sub-signals including k optical sub-signals, and adjust a phase of each optical sub-signal in the group of optical sub-signals, to obtain one group of intermediate optical signals including k intermediate optical signals. The group of intermediate optical signals includes k intermediate optical signals, where the k intermediate optical signals are optical signals obtained by shifting the k optical sub-signals by the beam splitting phase shifter by different phase offsets.

It can be learned that a quantity of optical sub-signals obtained by splitting one received input optical signal by the beam splitting phase shifter is the same as the amount of data included in the to-be-transformed two-dimensional data described above.

Then, each of the k beam splitting phase shifters outputs the group of intermediate optical signals through an output port. In this way, the k beam splitting phase shifters can output k groups of intermediate optical signals based on the input optical signals respectively received by the k beam splitting phase shifters.

It should be noted that each beam splitting phase shifter includes k output ports, and each of the k output ports is configured to output one intermediate optical signal. In addition, for each of the k beam splitting phase shifters, port numbers of the k output ports in each beam splitting phase shifter are different from each other. There are k output ports with a same port number in the k beam splitting phase shifters.

Figure 3:
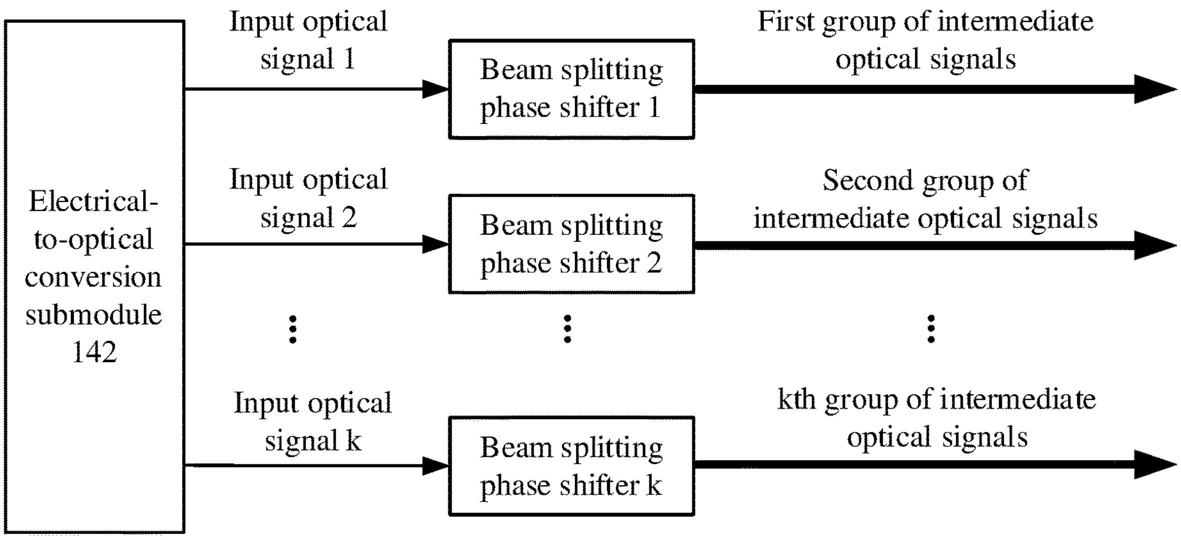
FIG. 3 is a diagram of k groups of intermediate optical signals output by k beam splitting phase shifters after performing beam splitting and phase shift processing on k input optical signals according to an embodiment of this application.

For example, FIG. 3 is a diagram of the k groups of intermediate optical signals output by the k beam splitting phase shifters after performing beam splitting and phase shift processing on the k input optical signals.

As shown in FIG. 3, the beam splitting phase shifter 1 is configured to perform beam splitting and phase shift processing on the input optical signal 1 received from the electrical-to-optical conversion submodule 142, and output, through k ports, a first group of intermediate optical signals including k intermediate optical signals.

Likewise, the beam splitting phase shifter 2 is configured to perform beam splitting and phase shift processing on the input optical signal 2 received from the electrical-to-optical conversion submodule 142, and output, through k ports, a second group of intermediate optical signals including k intermediate optical signals.

Likewise, the beam splitting phase shifter k is configured to perform beam splitting and phase shift processing on the input optical signal k received from the electrical-to-optical conversion submodule 142, and output, through k ports, a $k^{th}$ group of intermediate optical signals including k intermediate optical signals.

In an implementation, each of the k beam splitting phase shifters includes a beam splitter and k phase shifters. Each beam splitting phase shifter can implement, by using the beam splitter and the k phase shifters that are included in the beam splitting phase shifter, a function of obtaining one group of intermediate optical signals based on one input optical signal.

For a beam splitter and k phase shifters included in any one of the k beam splitting phase shifters, details are as follows:

The beam splitter includes one input port and k output ports, and any one of the k phase shifters includes one input port and one output port. In this case, the k output ports of the beam splitter may be coupled to k input ports of the k phase shifters by using a waveguide. The k output ports of the beam splitter are in one-to-one correspondence with the k input ports of the k phase shifters. It should be understood that the output port of the phase shifter is an output port that is of a beam splitting phase shifter to which the phase shifter belongs and that is configured to output an intermediate optical signal.

Herein, the waveguide is a structure that is deployed on the optical chip 11 and that is configured to transmit an optical signal. A material of the waveguide, a cross sectional shape of the waveguide, and a manner of fabricating the waveguide on the optical chip 11 are not limited in this embodiment of this application. The waveguide may be fabricated on the optical chip 11 by using a technical means such as etching, laser direct writing, ultraviolet curing, or ion injection. This is not limited in this embodiment of this application.

For a beam splitter in any one of the beam splitting phase shifters, the beam splitter is configured to receive one input optical signal from the electrical-to-optical conversion submodule 142, and is configured to split the received input optical signal into one group of optical sub-signals including k optical sub-signals.

Optionally, the beam splitter may be configured to evenly split the input optical signal received from the electrical-to-optical conversion submodule 142 into the k optical sub-signals.

Optionally, the beam splitter may be alternatively configured to split, according to any rule, the input optical signal received from the electrical-to-optical conversion submodule 142 into the k optical sub-signals. The any rule is not limited in this embodiment of this application.

For k phase shifters coupled to the beam splitter in any one of the beam splitting phase shifters, the k phase shifters are configured to adjust a phase of each optical sub-signal in the group of optical sub-signals obtained through beam splitting by the beam splitter, to obtain one group of intermediate optical signals including k intermediate optical signals. Then, the k phase shifters output the group of intermediate optical signals through k output ports.

It can be understood that the group of intermediate optical signals including the k intermediate optical signals obtained by the k phase shifters is one group of intermediate optical signals obtained by the any beam splitting phase shifter (that is, a beam splitting phase shifter to which the k phase shifters belong). Therefore, outputting the group of intermediate optical signals by the k phase shifters through the k output ports is equivalent to outputting the group of intermediate optical signals by the any beam splitting phase shifter through the k output ports.

A phase offset used for phase adjustment of the optical sub-signal by each of the k phase shifters may satisfy the following formula (2):

$$\psi(x,y,u,v)=\exp(i\cdot 2\pi(ux/m+vy/n)) \qquad \text{Formula (2)}$$

Herein, ψ represents the phase offset, a combination of x and y represents a number of the beam splitting phase shifter, numbers of the k beam splitting phase shifters correspond to location numbers of the plurality of pieces of data in the to-be-transformed two-dimensional data, a combination of u and v represents a port number of an output port of the beam splitting phase shifter, values of x and u are integers in a range [1, m], values of y and v are integers in a range [1, n], both m and n are positive integers greater than 1, and i is an imaginary number symbol.

It can be learned that each beam splitting phase shifter includes one output port whose port number is (u, v). Therefore, the k beam splitting phase shifters include k output ports whose port numbers are (u, v).

Figure 4:
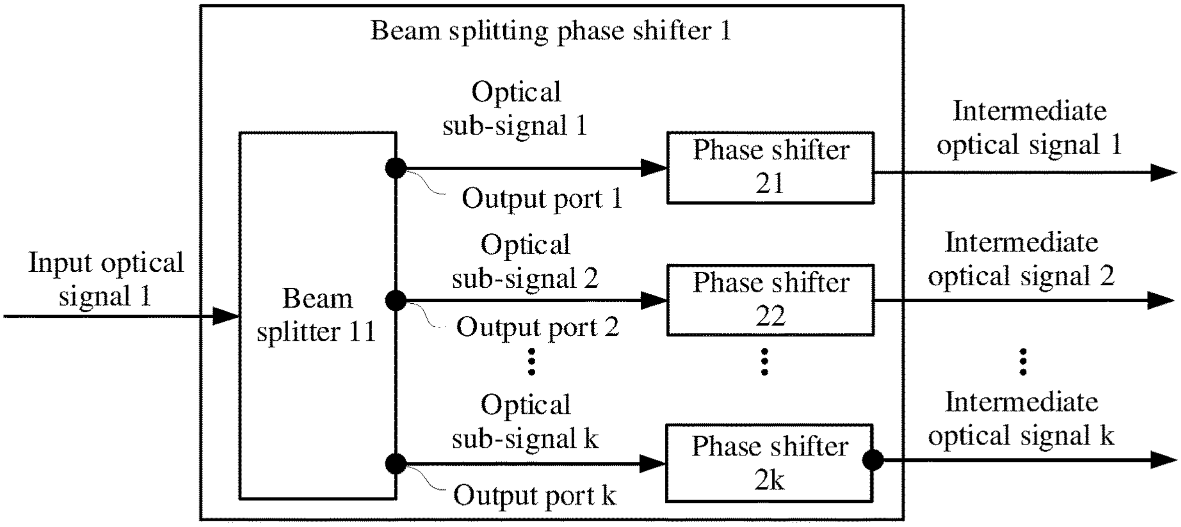
FIG. 4 is a flowchart of processing a received input optical signal by a beam splitting phase shifter according to an embodiment of this application.

For example, any one of the beam splitting phase shifters is the beam splitting phase shifter 1 shown in FIG. 1*b* or FIG. 2. FIG. 4 is a flowchart of processing the received input optical signal 1 by the beam splitting phase shifter 1.

As shown in FIG. 4, the beam splitting phase shifter 1 includes a beam splitter 11 and k phase shifters, and the k phase shifters include a phase shifter 21, a phase shifter 22, . . . , and a phase shifter 2*k*. An input port of the phase shifter 21 is coupled to an output port 1 of the beam splitter 11, an input port of the phase shifter 22 is coupled to an output port 2 of the beam splitter 11, . . . , and an input port of the phase shifter 2*k* is coupled to an output port k of the beam splitter 11.

In this way, after receiving the input optical signal 1, the beam splitter 11 can split the input optical signal 1 into one group of optical sub-signals including k optical sub-signals. The k optical sub-signals include an optical sub-signal 1, an optical sub-signal 2, . . . , and an optical sub-signal k that are shown in FIG. 4. Then, the beam splitter 11 may output the optical sub-signal 1 to the phase shifter 21 through the output port 1, output the optical sub-signal 2 to the phase shifter 22 through the output port 2, . . . , and output the optical sub-signal k to the phase shifter 2*k* through the output port k.

Then, the phase shifter 21 receives the optical sub-signal 1, and adjusts a phase of the optical sub-signal 1 to obtain a phase-shifted intermediate optical signal 1. Likewise, the phase shifter 22 receives the optical sub-signal 2, and adjusts a phase of the optical sub-signal 2 to obtain a phase-shifted intermediate optical signal 2, . . . , and the phase shifter 2*k* receives the optical sub-signal k, and adjusts a phase of the optical sub-signal k to obtain a phase-shifted intermediate optical signal k. It should be understood that the intermediate optical signal 1, the intermediate optical signal 2, . . . , and the intermediate optical signal k are one group of intermediate optical signals obtained by the beam splitting phase shifter 1 based on the input optical signal 1.

Optionally, the beam splitter in any one of the beam splitting phase shifters may include any one of an optical waveguide furcation structure, a grating structure, a directional coupler structure, or the like deployed on the optical chip 11. In other words, a function implemented by the beam splitter in this embodiment of this application may be implemented by using any one of the optical waveguide furcation structure, the grating structure, the directional coupler structure, or the like deployed on the optical chip 11. This is not limited in this embodiment of this application. For example, the optical waveguide furcation structure may be an optical waveguide furcation structure similar to a Y-bifurcation device. The grating structure may be a Dammann grating structure.

Optionally, each of the k phase shifters in any one of the beam splitting phase shifters includes a waveguide, and the k phase shifters include k waveguides with different attribute parameters. That is, the k phase shifters may implement functions of the k phase shifters by using the k waveguides with different attribute parameters. An attribute of the waveguide may be any one of a length of the waveguide, a refractive index of the waveguide, or a temperature of the waveguide. The k waveguides with different attribute parameters may be k waveguides with different lengths, waveguides with different refractive indexes, waveguides with different temperatures, or the like.

In this case, the functions implemented by the k phase shifters in this embodiment of this application may be implemented by using the k waveguides that are deployed on the optical chip 11 and that have different lengths, or may be implemented by using the k waveguides that are deployed on the optical chip 11 and that have different refractive indexes, or may be implemented by using the k waveguides that are deployed on the optical chip 11 and that have different temperatures. This is not limited in this embodiment of this application.

It should be understood that the k waveguides with different lengths may adjust, by k different phase offsets, optical signals transmitted by the k waveguides. That is, there is a correspondence between a length of the waveguide and a phase offset of an optical signal transmitted through the waveguide when being output from the waveguide compared with when being input to the waveguide. Therefore, for a beam splitting phase shifter whose number is (x, y), in this embodiment of this application, k phase offsets by which k phase shifters in the beam splitting phase shifter need to adjust phases of received optical sub-signals may be first determined based on the foregoing formula (2), and then, k waveguides configured to implement functions of the k phase shifters can be fabricated on the optical chip 11 based on correspondences between the determined k phase offsets and waveguide lengths.

It should be further understood that the k waveguides with different refractive indexes may adjust, by k different phase offsets, optical signals transmitted by the k waveguides. That is, there is a correspondence between a refractive index of the waveguide and a phase offset of an optical signal transmitted through the waveguide when being output from the waveguide compared with when being input to the waveguide. Therefore, for a beam splitting phase shifter whose number is (x, y), in this embodiment of this application, k phase offsets by which k phase shifters in the beam splitting phase shifter need to adjust phases of optical sub-signals may be first determined based on the foregoing formula (2), and then, k waveguides configured to implement functions of the k phase shifters can be fabricated on the optical chip 11 based on correspondences between the determined k phase offsets and waveguide refractive indexes.

Optionally, in this embodiment of this application, waveguides with different refractive indexes may be fabricated through waveguide doping during waveguide fabrication. Details are not described herein.

It should be further understood that the k waveguides with different temperatures may adjust, by k different phase offsets, optical signals transmitted by the k waveguides. That is, there is a correspondence between a temperature of the waveguide and a phase offset of an optical signal transmitted through the waveguide when being output from the waveguide compared with when being input to the waveguide. Therefore, for a beam splitting phase shifter whose number is (x, y), in this embodiment of this application, k phase offsets by which k phase shifters in the beam splitting phase shifter need to adjust phases of optical sub-signals may be first determined based on the foregoing formula (2), and then, k waveguides configured to implement functions of the k phase shifters can be fabricated on the optical chip 11 based on correspondences between the determined k phase offsets and waveguide temperatures.

Optionally, in this embodiment of this application, global or local temperature control may be performed on the waveguide by using a phase shift region design commonly used in a Mach-Zehnder interferometer (MZI) or a micro ring modulator. Alternatively, in this embodiment of this application, temperature control may be performed on a waveguide surface through electric control adjustment. For example, in this embodiment of this application, a carrier may be injected into a whole or partial waveguide surface region, and a current of the carrier is regulated, so as to perform temperature control on the waveguide surface region covered by the carrier. Certainly, this application is not limited thereto.

In another implementation, each of the k beam splitting phase shifters includes a diffraction structure. In this case, for any beam splitting phase shifter, a function of obtaining one group of intermediate optical signals based on one input optical signal can be implemented by using a diffraction structure in the any beam splitting phase shifter.

Optionally, the diffraction structure may be etched on the optical chip 11 in advance through an etching process. Herein, a structural parameter of the diffraction structure may include at least one of parameters such as a hole punching position on the optical chip 11, a hole shape, a hole depth, or a hole diameter.

Optionally, the structural parameter of the diffraction structure may be obtained through iterative training of a simulation system. The structural parameter of the diffraction structure may be obtained through reverse iterative training performed by the simulation system on a structural parameter of an initial structure. Herein, the structural parameter of the initial structure may be obtained by a designer through preliminary design based on experience.

In this embodiment of this application, an objective function used to describe a function implemented by any beam splitting phase shifter may be constructed in advance based on a quantity of optical sub-signals into which an input optical signal that is input to the any beam splitting phase shifter needs to be split and a phase offset by which each optical sub-signal obtained through beam splitting needs to be phase-shifted. The quantity of optical sub-signals into which the input optical signal that is input to the any beam splitting phase shifter needs to be split is equal to the amount of data included in the to-be-transformed two-dimensional data described above. In other words, the quantity of optical sub-signals into which the input optical signal that is input to the any beam splitting phase shifter needs to be split is k. In addition, the phase offset by which each optical sub-signal obtained through beam splitting needs to be phase-shifted may be obtained through calculation based on the foregoing formula (2), and details are not described herein.

In this way, any computing device with a computing processing capability can perform, by using the simulation system, reverse iterative training on the structural parameter of the initial structure based on the pre-constructed objective function of the any beam splitting phase shifter, so as to obtain an objective structural parameter of an objective structure. It should be understood that the objective structure is the foregoing diffraction structure, and the objective parameter is the structural parameter of the foregoing diffraction structure.

The simulation system is not limited in this embodiment of this application. It should be understood that any simulation system that can simulate, by using software, a process of processing an input optical signal by a hardware structure on the optical chip 11 shall fall within the protection scope of embodiments of this application.

For example, a process in which a computing device performs, by using the simulation system, reverse iterative training on the structural parameter of the initial structure based on the pre-constructed objective function of the any beam splitting phase shifter, so as to obtain the objective structural parameter of the objective structure may be implemented through the following steps:

Step 1: The computing device sets, in the simulation system, a hardware structure on the chip by using the structural parameter of the initial structure.

Step 2: By using the simulation system, the computing device inputs a preset optical signal to the hardware structure, and outputs a result of processing the preset optical signal by the hardware structure.

It should be understood that the preset optical signal is the input optical signal that is input to the any beam splitting phase shifter and that is one of the k optical signals generated by the electrical-to-optical conversion submodule 142.

Step 3: The computing device determines a degree of difference between the processing result and the objective function.

Step 4: When the degree of difference determined by the computing device is greater than a preset threshold, the computing device adjusts the structural parameter of the current hardware structure based on the degree of difference, and sets, in the simulation system, the hardware structure on the chip by using an adjusted structural parameter.

Then, the computing device may repeatedly perform step 2 to step 4 until a degree of difference determined by the computing device is less than the preset threshold. It can be understood that, in this embodiment of this application, a value of the preset threshold is not limited, and a case in which a degree of difference determined by the computing device is equal to the preset threshold is not limited.

It should be understood that when the computing device performs step 2 to step 4 for the first time, the current hardware structure in step 4 is the foregoing initial structure, and the structural parameter of the current hardware structure in step 4 is the structural parameter of the foregoing initial structure.

It should be further understood that when the degree of difference determined by the computing device is less than the preset threshold for the first time, the computing device may determine, as the objective structure, a hardware structure currently set in the simulation system, and determine, as the objective structural parameter, a structural parameter used to set the hardware structure on the chip. It can be understood that a processing result obtained by processing the preset optical signal by the objective structure is a processing result used by the computing device to determine the degree of difference less than the preset threshold.

In this way, in this embodiment of this application, the objective structure (that is, the foregoing diffraction structure) can be obtained by etching on the optical chip 11 through a process such as an etching process based on the objective structural parameter determined by the computing device.

The beam combination module 13 includes a connection structure and k beam combiners.

The connection structure in the beam combination module 13 is configured to transmit, to a same beam combiner in the k beam combiners, k intermediate optical signals output from output ports with a same port number in the k beam splitting phase shifters in the beam splitting phase shift module 12. In this case, the same beam combiner may combine the k intermediate optical signals into one output optical signal, and output the output optical signal.

From the foregoing descriptions, it can be learned that port numbers of k output ports of one beam splitting phase shifter are different from each other. Therefore, for k intermediate optical signals output from k output ports with a same port number in the k beam splitting phase shifters, the k intermediate optical signals include one intermediate optical signal in each of the k groups of intermediate optical signals output by the k beam splitting phase shifters. In other words, one output optical signal that is output by the beam combiner includes one intermediate optical signal in each of the k groups of intermediate optical signals output by the k beam splitting phase shifters.

In this way, the k beam combiners can output k output optical signals, and optical axes of the k output optical signals are located in a same plane. For example, the optical axes of the k output optical signals are located in the plane of the optical chip 11. Herein, data indicated by the k output optical signals is target two-dimensional data obtained through two-dimensional Fourier transform of the to-be-transformed two-dimensional data.

In an implementation, the connection structure may be implemented by using a waveguide network deployed on the plane of the optical chip 11. It can be learned that the waveguide network is a waveguide network on a two-dimensional plane. A connection at a crosspoint of a plurality of waveguides in the waveguide network may be implemented by using a coupler. The coupler is configured to avoid mutual crosstalk between optical signals transmitted in the plurality of waveguides crossing each other in the waveguide network. For example, the coupler may be a crossing device.

Figure 5:
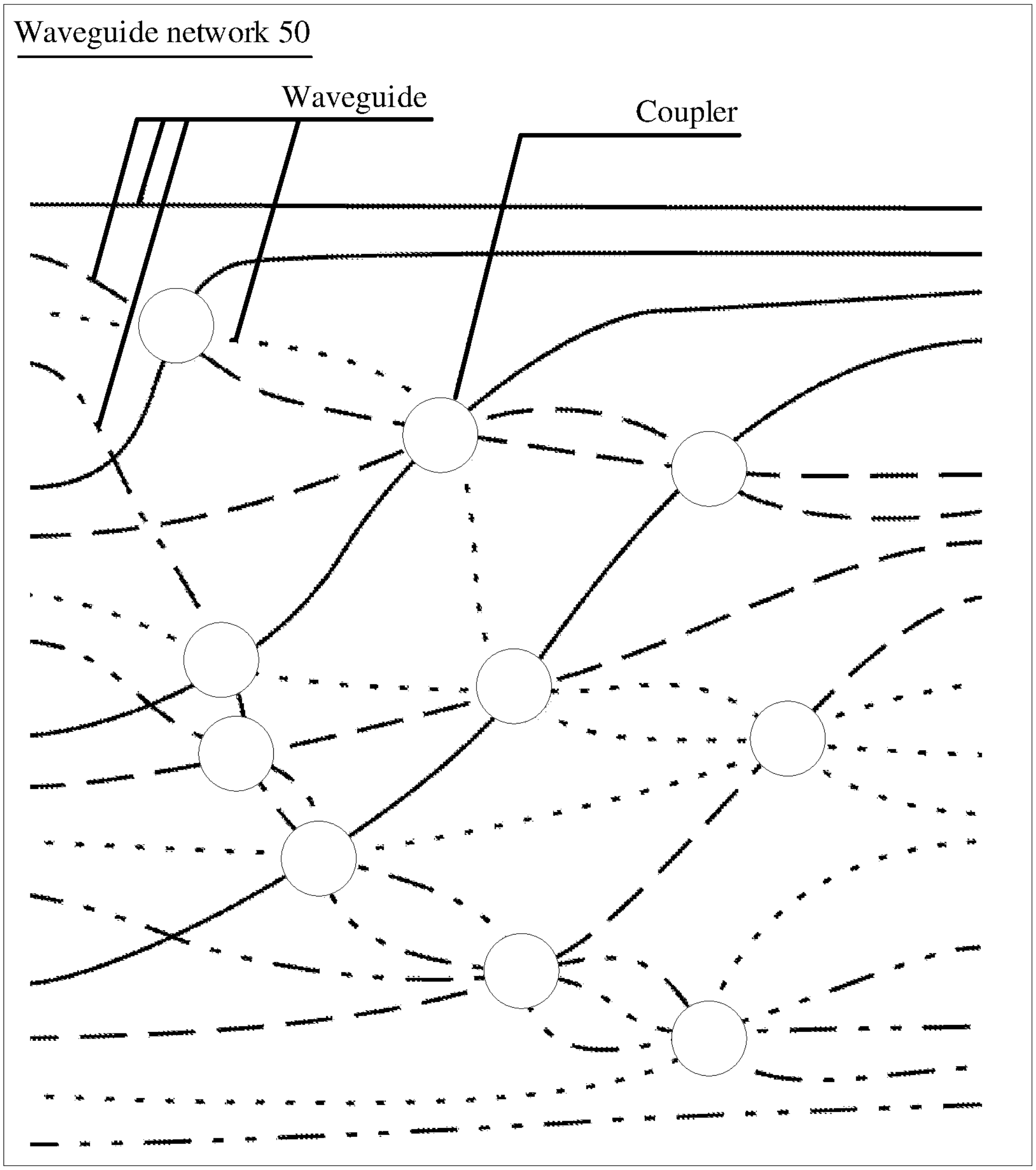
FIG. 5 is a diagram of a waveguide network according to an embodiment of this application.

For example, FIG. 5 is a diagram of a waveguide network. As shown in FIG. 5, the waveguide network 50 includes a plurality of waveguides (a plurality of waveguides shown by solid lines and dashed lines in FIG. 5) deployed in the plane of the optical chip 11. Connections at crosspoints of the plurality of waveguides are implemented by using couplers shown by circles in FIG. 5. This avoids mutual crosstalk between optical signals transmitted in a plurality of waveguides connected by the coupler.

In another implementation, the connection structure may be implemented by using a three-dimensional waveguide connection structure deployed on the optical chip 11. The three-dimensional waveguide connection structure on the optical chip 11 may be fabricated by using a technology such as laser direct writing, three-dimensional printing, or ultraviolet curing. A technology for fabricating the three-dimensional waveguide connection structure is not limited in this embodiment of this application.

It should be understood that crossing between a plurality of waveguides in a single plane can be avoided when the connection structure is the three-dimensional waveguide connection structure. In this case, a plurality of waveguides do not need to be connected by a crossing device, so that design and production of the crossing device are omitted. In other words, this implementation simplifies a process of fabricating the connection structure in the beam combination module 13 on the optical chip 11.

Optionally, any one of the k beam combiners in the beam combination module 13 may include any one of a directional coupler structure, a multimode interferometer (MMI) beam combination structure, a tapered transition waveguide beam combination structure, a Y-shaped beam combination structure, or the like. In other words, a function implemented by any beam combiner in this embodiment of this application may be implemented by using any one of the directional coupler structure, the MMI beam combination structure, the tapered transition waveguide beam combination structure, the Y-shaped beam combination structure, or the like. This is not limited in this embodiment of this application.

The post processing module 15 may include a photoelectric detection submodule 151 and a computing submodule 152.

The photoelectric detection submodule 151 is configured to receive the k output optical signals output by the beam combination module 13, and output detection results of the k output optical signals in a form of an electrical signal. The detection result of the optical signal may be light intensity or a light spot shape of the optical signal. This is not limited in this embodiment of this application.

It should be understood that the photoelectric detection submodule 151 may implement a function of the photoelectric detection submodule 151 by using a photoelectric detection array. The photoelectric detection array includes at least k photoelectric detection units. One photoelectric detection unit is configured to receive one of the k output optical signals, and the k photoelectric detection units are configured to simultaneously receive the k output optical signals output by the beam combination module. For example, the photoelectric detection submodule 151 may be a charge coupled device (CCD) that includes at least k pixel units.

The computing submodule 152 is configured to determine, according to the predefined rule and based on the detection results output by the photoelectric detection submodule 151, k pieces of data indicated by the k output optical signals. The predefined rule is the predefined rule described above, and details are not described herein again.

Further, the computing submodule 152 converts the determined k pieces of data into the target two-dimensional data, and the target two-dimensional data is the data obtained through two-dimensional Fourier transform of the to-be-transformed two-dimensional data. For descriptions of converting, by the computing submodule 152, the determined k pieces of data into the target two-dimensional data, refer to the descriptions in the following method. Details are not described herein.

It can be understood that the computing submodule 152 in the post processing module 15 and the computing submodule 141 in the preprocessing module 14 may be the same computing submodule, or may be different computing submodules. This is not limited in this embodiment of this application.

It can be further understood that, when the computing submodule 152 in the post processing module 15 and the computing submodule 141 in the preprocessing module 14 are not the same computing submodule, for a hardware structure of the computing submodule 152, reference may be made to related descriptions of the computing submodule 141 in the foregoing content. Details are not described herein.

It should be noted that, in the transform system 10, the one-dimensional optical signals that are generated by the electrical-to-optical conversion submodule 142 and that include the k input optical signals may be directly received and processed by the beam splitting phase shift module 12. Certainly, the one-dimensional optical signals that are generated by the electrical-to-optical conversion submodule 142 and that include the k input optical signals may be first processed by an optical-path structure having another function purpose, and then received and processed by the beam splitting phase shift module 12. This is not limited in this embodiment of this application.

In addition, one-dimensional optical signals that are output by the beam combination module 13 in the transform system 10 and that include the k output optical signals may be directly received and processed by the photoelectric detection submodule 151. Certainly, one-dimensional optical signals that are output by the beam combination module 13 and that include the k output optical signals may be first processed by an optical-path structure having another function purpose, and then received and processed by the photoelectric detection submodule 151. This is not limited in this embodiment of this application.

The optical-path structure having another function purpose may be an optical-path structure on the optical chip 11, or may be an optical-path structure independent of the optical chip 11. This is not limited in this embodiment of this application.

Figure 6:
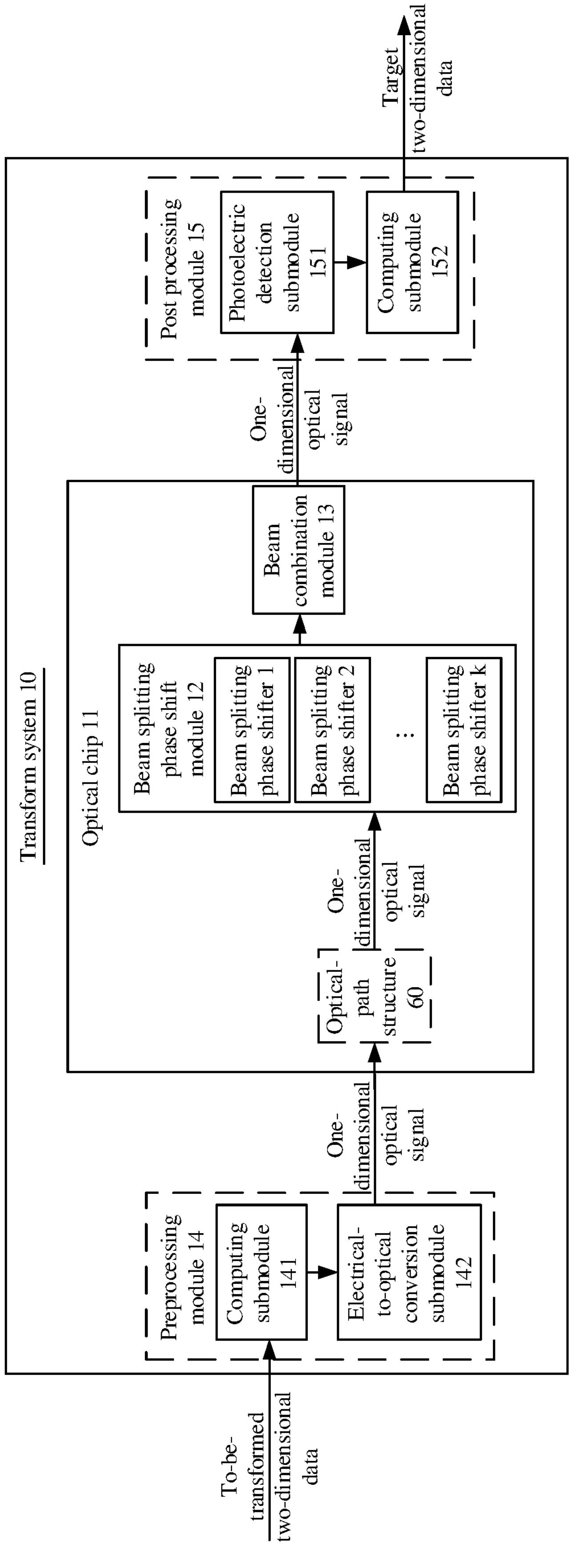
FIG. 6 is a diagram of a structure of another two-dimensional Fourier transform system according to an embodiment of this application.

For example, with reference to FIG. 1*b*, FIG. 6 is a diagram of another structure of the transform system 10.

As shown in FIG. 6, the optical chip 11 in the transform system 10 further includes an optical-path structure 60. The optical-path structure 60 is configured to receive the one-dimensional optical signals that are generated by the electrical-to-optical conversion submodule 142 and that include the k input optical signals, and process the one-dimensional optical signals. Then, the optical-path structure 60 outputs processed one-dimensional optical signals to the beam splitting phase shift module 12, so that the beam splitting phase shift module 12 performs beam splitting and phase shift processing on the one-dimensional optical signals processed by the optical-path structure 60.

Figure 7:
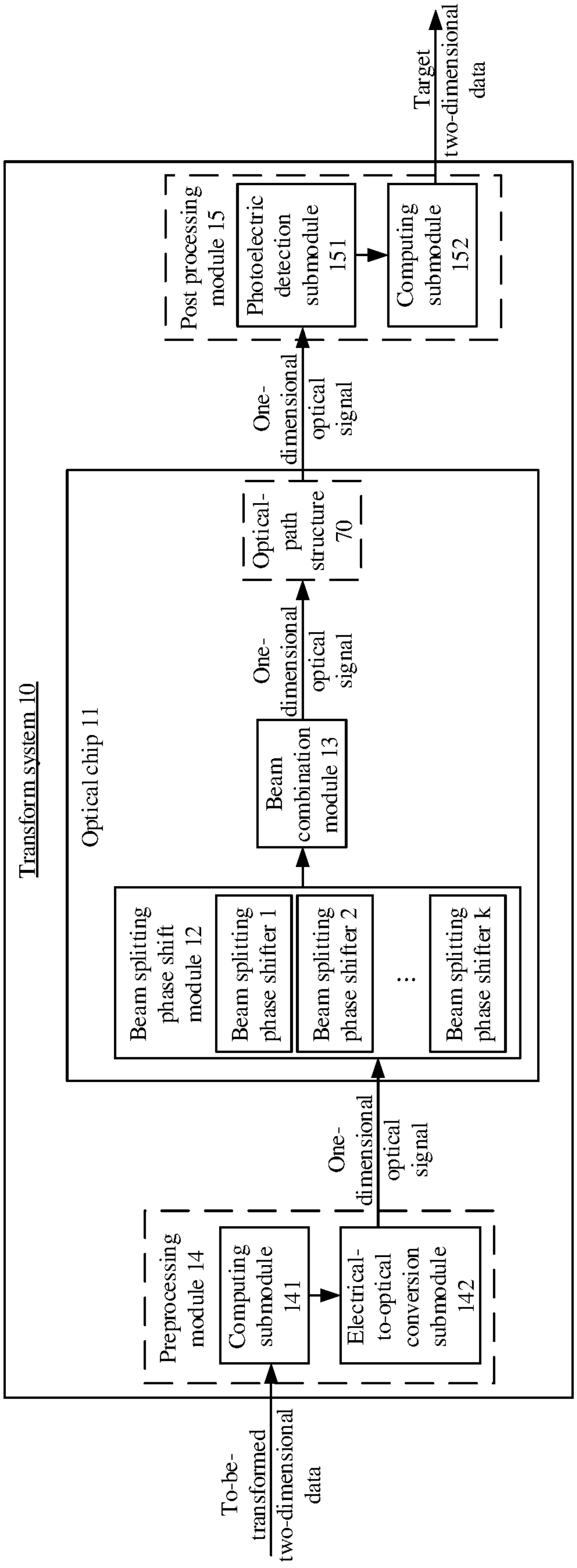
FIG. 7 is a diagram of a structure of still another two-dimensional Fourier transform system according to an embodiment of this application.

For another example, with reference to FIG. 1*b*, FIG. 7 is a diagram of still another structure of the transform system 10.

As shown in FIG. 7, the optical chip 11 in the transform system 10 further includes an optical-path structure 70. The optical-path structure 70 is configured to receive the one-dimensional optical signals that are output by the beam combination module 13 and that include the k output optical signals, and process the one-dimensional optical signals. Then, the optical-path structure 70 outputs processed one-dimensional optical signals to the photoelectric detection submodule 151, so that the photoelectric detection submodule 151 performs corresponding processing on the one-dimensional optical signals processed by the optical-path structure 70.

In some embodiments, embodiments of this application further provide an optical chip, for example, the optical chip shown in FIG. 1*b*. Details are not described again.

The method provided in embodiments of this application is described in detail below with reference to the accompanying drawings.

Figure 8:
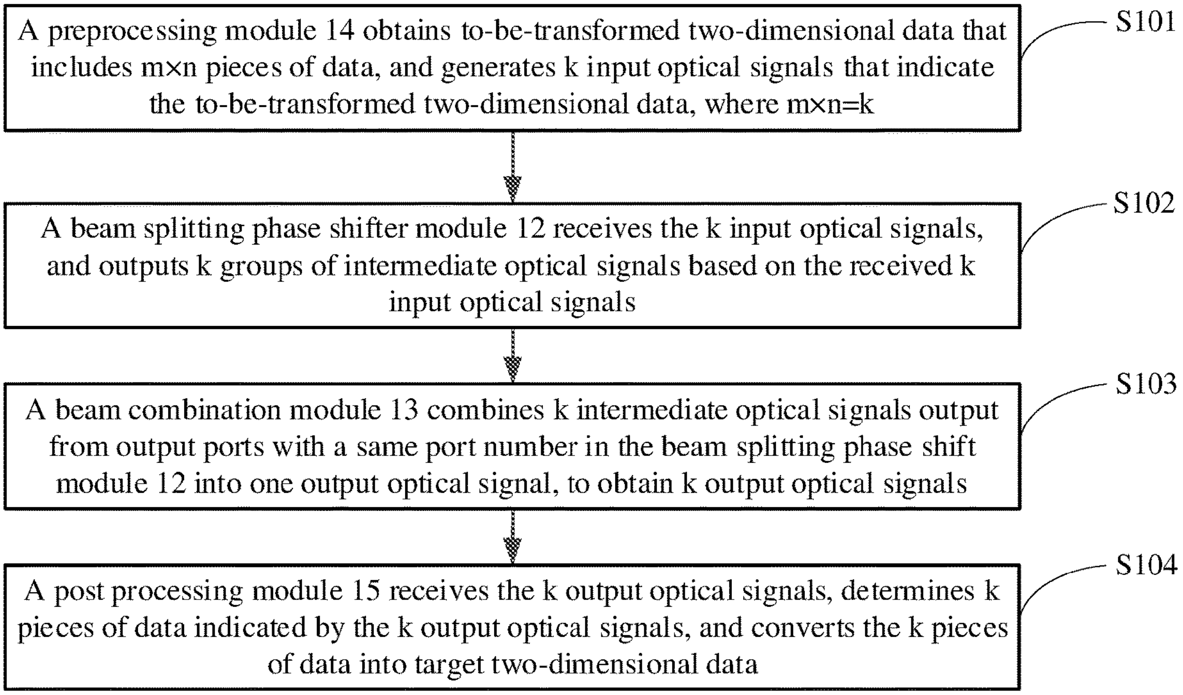
FIG. 8 is a flowchart of an optical computing method according to an embodiment of this application.

FIG. 8 is a flowchart of an optical computing method according to an embodiment of this application. The method may be applied to the transform system 10 shown in FIG. 1*b*. For ease of description, in this embodiment of this application, an example in which input data including a plurality of elements is to-be-transformed two-dimensional data including m×n pieces of data is used for description. The method may include the following steps.

S101: A preprocessing module 14 obtains the to-be-transformed two-dimensional data that includes the m×n pieces of data, and generates k input optical signals that indicate the to-be-transformed two-dimensional data, where m×n=k.

The preprocessing module 14 may obtain, in advance or in real time, the to-be-transformed two-dimensional data that includes the m×n pieces of data.

Optionally, the to-be-transformed two-dimensional data may be two-dimensional data of an image, or two-dimensional data of an image frame in a video. This is not limited in this embodiment of this application. The image or the video may be an image or a video in a local gallery, may be an image or a video downloaded from a network, may be an image or a video received by using social software, or may be an image or a video shot in real time. This is not limited in this embodiment of this application.

In this case, in an example, the preprocessing module 14 may obtain the two-dimensional data of the to-be-processed image from the local gallery, and use the two-dimensional data of the to-be-processed image as the to-be-transformed two-dimensional data. Alternatively, the preprocessing module 14 may obtain the two-dimensional data of the image frame in the to-be-processed video from the local gallery, and use the two-dimensional data of the image frame as the to-be-transformed two-dimensional data.

In another example, the preprocessing module 14 may download the to-be-processed image from the network, and use the two-dimensional data of the to-be-processed image as the to-be-transformed two-dimensional data. Alternatively, the preprocessing module 14 may download the to-be-processed video from the network, and use the two-dimensional data of the image frame in the to-be-processed video as the to-be-transformed two-dimensional data.

In still another example, the preprocessing module 14 may receive the to-be-processed image by using the social software, and use the two-dimensional data of the to-be-processed image as the to-be-transformed two-dimensional data. Alternatively, the preprocessing module 14 may receive the to-be-processed video by using the social software, and use the two-dimensional data of the image frame in the to-be-processed video as the to-be-transformed two-dimensional data.

In yet another example, the preprocessing module 14 may use the two-dimensional data of the image shot by a local device in real time, as the to-be-transformed two-dimensional data. Alternatively, the preprocessing module 14 may use the two-dimensional data of the image frame in the video shot by a local device in real time, as the to-be-transformed two-dimensional data.

For ease of description, in this embodiment of this application, one piece of data in the to-be-transformed two-dimensional data including the m×n pieces of data is represented as D(x, y), where x and y are respectively sequence numbers of the to-be-transformed two-dimensional data in two directions in a two-dimensional plane, that is, a combination of x and y may represent a location number of the data D(x, y) in the to-be-transformed two-dimensional data. A value of x is an integer in a range [1, m], and a value of y is an integer in a range [1, n].

For example, when the to-be-transformed two-dimensional data is represented as a matrix, the to-be-transformed two-dimensional data including the m×n pieces of data may be represented as a matrix (1):

$$\begin{bmatrix} D(1,1) & \dots & D(m,1) \\ \vdots & \dots & \vdots \\ D(1,n) & \dots & D(m,n) \end{bmatrix} \quad \text{Matrix (1)}$$

It can be learned that D(x, y) may be one piece of data whose location number is (x, y) in the matrix (1).

In this case, optionally, after obtaining the to-be-transformed two-dimensional data, the preprocessing module 14 may expand, according to a first preset rule, the to-be-transformed two-dimensional data into one group of one-dimensional data including k pieces of data. Then, the preprocessing module 14 may generate, by using an electrical-to-optical conversion submodule 142 and according to the predefined rule described above, k optical signals in one-to-one correspondence with the k pieces of data. The k optical signals are the k input optical signals described above. It should be understood that the k input optical signals are one group of one-dimensional optical signals that indicate the to-be-transformed two-dimensional data.

For detailed descriptions of generating the k optical signals by the electrical-to-optical conversion submodule 142, refer to the foregoing related descriptions of the electrical-to-optical conversion submodule 142. Details are not described herein again.

The first preset rule may be either a row-major rule or a column-major rule. This is not limited in this embodiment of this application.

In an implementation, when the first preset rule is the row-major rule, for the to-be-transformed two-dimensional data including the m×n pieces of data, the preprocessing module 14 may expand the to-be-transformed two-dimensional data including the m×n pieces of data into one group of one-dimensional data by row.

The preprocessing module 14 may arrange n rows of data in the to-be-transformed two-dimensional data in order, to obtain a first data queue including the n rows of data. The first data queue is the group of one-dimensional data obtained by expanding the to-be-transformed two-dimensional data by row.

It can be learned from the foregoing descriptions that, in the to-be-transformed two-dimensional data that includes the m×n pieces of data, each row of data includes m pieces of data, and therefore, the first data queue including the n rows of data in the to-be-transformed two-dimensional data includes the m×n pieces of data. That is, the group of one-dimensional data into which the to-be-transformed two-dimensional data including the m×n pieces of data is expanded by row includes the k pieces of data.

For example, for the to-be-transformed two-dimensional data represented as the matrix (1), the first data queue including the n rows of data in the to-be-transformed two-dimensional data is:

D(1, 1), . . . , D(m, 1), . . . , D(1, n), . . . , D(m, n).

Herein, the first data queue is the group of one-dimensional data that includes the k pieces of data and into which the to-be-transformed two-dimensional data represented as the matrix (1) is expanded by row.

In another implementation, when the first preset rule is the column-major rule, for the to-be-transformed two-dimensional data including the m×n pieces of data, the preprocessing module 14 may expand the to-be-transformed two-dimensional data including the m×n pieces of data into one group of one-dimensional data by column.

The preprocessing module 14 may arrange m columns of data in the to-be-transformed two-dimensional data in order, to obtain a second data queue including the m columns of data. The second data queue is the group of one-dimensional data obtained by expanding the to-be-transformed two-dimensional data by column.

It can be learned from the foregoing descriptions that, in the to-be-transformed two-dimensional data that includes the m×n pieces of data, each column of data includes n pieces of data, and therefore, the second data queue including them columns of data in the to-be-transformed two-dimensional data includes the m×n pieces of data. That is, the group of one-dimensional data into which the to-be-transformed two-dimensional data including the m×n pieces of data is expanded by column includes the k pieces of data.

For example, for the to-be-transformed two-dimensional data represented as the matrix (1), the second data queue including the m columns of data in the to-be-transformed two-dimensional data is:

D(1, 1), . . . , D(1, n), . . . , D(m, 1), . . . , D(m, n).

Herein, the second data queue is the group of one-dimensional data that includes the k pieces of data and into which the to-be-transformed two-dimensional data represented as the matrix (1) is expanded by column.

It should be understood that the preprocessing module 14 may obtain, by using a computing submodule 141 in the preprocessing module 14, the to-be-transformed two-dimensional data that includes the m×n pieces of data, and expand the obtained to-be-transformed two-dimensional data by row or by column, to obtain the group of one-dimensional data that includes the k pieces of data. For descriptions of the computing submodule 141, refer to the foregoing descriptions of the computing submodule 141. Details are not described herein again.

For ease of description, an example in which the to-be-transformed two-dimensional data is expanded by row is used. If the group of one-dimensional data obtained by expanding the to-be-transformed two-dimensional data by row is D(1, 1), . . . , D(m, 1), . . . , D(1, n), . . . , and D(m, n), the k input optical signals that indicate the k pieces of data in the group of one-dimensional data are represented as A(1, 1), . . . , A(m, 1), . . . , A(1, n), . . . , and A(m, n) in the following content in this embodiment of this application.

It can be learned that A(x, y) is one of the k input optical signals, and may indicate one piece of data D(x, y), where a value of x is an integer in the range [1, m], and a value of y is an integer in the range [1, n].

S102: A beam splitting phase shift module 12 receives the k input optical signals, and outputs k groups of intermediate optical signals based on the received k input optical signals.

For detailed descriptions of outputting, by the beam splitting phase shift module 12, the k groups of intermediate optical signals based on the received k input optical signals, refer to the foregoing related descriptions of the beam splitting phase shift module 12. Details are not described herein again.

From the foregoing content, it can be learned that k beam splitting phase shifters in the beam splitting phase shift module 12 are configured to receive the k input optical signals, and one beam splitting phase shifter is configured to receive one input optical signal. Therefore, when the k input optical signals are represented as A(1, 1), . . . , A(m, 1), . . . , A(1, n), . . . , and A(m, n), the k beam splitting phase shifters configured to receive and process the k input optical signals may be represented as M(1, 1), . . . , M(m, 1), . . . , M(1, n), . . . , and M(m, n).

It can be learned that M(x, y) is one of the k beam splitting phase shifters, and (x, y) is a number of the beam splitting phase shifter, where a value of x is an integer in the range [1, m], and a value of y is an integer in the range [1, n].

For ease of description, in the following content in this embodiment of this application, an example in which the beam splitting phase shifter M(x, y) is configured to receive and process the input optical signal A(x, y) is used for description. For example, the beam splitting phase shifter M(1, 1) is configured to process the input optical signal A(1, 1). For another example, the beam splitting phase shifter M(m, n) may be configured to process the input optical signal A(m, n). Other examples are not enumerated.

It can be learned from the foregoing descriptions that, for the input optical signal A(x, y), after splitting the input optical signal A(x, y) into one group of optical sub-signals including k optical sub-signals, the beam splitting phase shifter M(x, y) further adjusts a phase of each optical sub-signal in the group of optical sub-signals, to obtain one group of intermediate optical signals.

Each optical sub-signal in the group of optical sub-signals including the k optical sub-signals and obtained by splitting the input optical signal A(x, y) by the beam splitting phase shifter M(x, y) may be represented as $$\frac{1}{k}A(x, y),$$

that is, $$\frac{1}{m*n}A(x, y).$$

It should be understood that a process in which the beam splitting phase shifter M(x, y) splits the input optical signal A(x, y) into the k optical sub-signals has the following mathematical effect: The data D(x, y) corresponding to the input optical signal A(x, y) is extended into k pieces of data, where an optical signal corresponding to each of the k pieces of data may be represented by $$\frac{1}{k}A(x, y),$$

or an optical signal corresponding to each of the k pieces of data may be represented by $$\frac{1}{m*n}A(x, y).$$

When the beam splitting phase shifter M(x, y) adjusts phases of the k optical sub-signals obtained by splitting the input optical signal A(x, y), a phase offset $\psi$ used for adjustment satisfies the foregoing formula (2), and details are not described herein again.

In this way, for the beam splitting phase shifter M(x, y) configured to receive and process the input optical signal A(x, y), k intermediate optical signals obtained by the beam splitting phase shifter M(x, y) by splitting the received input optical signal A(x, y) and adjusting the phase of each optical sub-signal obtained through the beam splitting may be represented as:

$$\frac{1}{m*n}A(x,y)\exp\left(i\cdot 2\pi\left({}^{1*x}/_m+{}^{1*y}/_n\right)\right),\ \ldots,$$

$$\frac{1}{m*n}A(x,y)\exp\left(i\cdot 2\pi\left({}^{1*x}/_m+{}^{n*y}/_n\right)\right),\ \ldots,$$

$$\frac{1}{m*n}A(x,y)\exp\left(i\cdot 2\pi\left({}^{u*x}/_m+{}^{v*y}/_n\right)\right),\ \ldots,$$

$$\text{and } \frac{1}{m*n}A(x,y)\exp\left(i\cdot 2\pi\left({}^{m*x}/_m+{}^{n*y}/_n\right)\right).$$

S103: A beam combination module 13 combines k intermediate optical signals output from output ports with a same port number in the beam splitting phase shift module 12 into one output optical signal, to obtain k output optical signals.

For descriptions of combining, by the beam combination module 102, k intermediate optical signals output from output ports with a same port number in the beam splitting phase shift module 12 into one output optical signal, to obtain the k output optical signals, refer to the foregoing descriptions of the beam combination module 102. Details are not described herein again.

For ease of description, in this embodiment of this application, one output optical signal obtained by combining k intermediate optical signals output from k output ports with a port number (u, v) in the beam splitting phase shift module 12 is represented as B(u, v). In this case, the k output optical signals obtained by performing S103 in this embodiment of this application may be represented as B(1, 1), . . . , B(m, 1), . . . , B(1, n), . . . , and B(m, n). A value of u is an integer in the range [1, m], and a value of v is an integer in the range [1, n]. It can be learned that B(u, v) is one of the k output optical signals.

It should be understood that combining intermediate optical signals output from output ports with a same port number in the beam splitting phase shift module 12 is equivalent to adding up data indicated by the intermediate optical signals output from the output ports with the same port number in the beam splitting phase shift module 12. Therefore, according to a definition of two-dimensional Fourier transform (for example, the formula (1)), it can be learned that two-dimensional data indicated by the output optical signals obtained by combining intermediate optical signals output from output ports with a same port number in the beam splitting phase shift module 12 is two-dimensional data obtained through Fourier transform of the to-be-transformed two-dimensional data.

S104: A post processing module 15 receives the k output optical signals, determines k pieces of data indicated by the k output optical signals, and converts the k pieces of data into target two-dimensional data.

The target two-dimensional data is the data obtained through Fourier transform of the to-be-transformed two-dimensional data. Because a matrix size of the two-dimensional data before and after Fourier transform does not change, the target two-dimensional data includes m×n pieces of data.

For detailed descriptions of receiving, by the post processing module 15, the k output optical signals and determining the k pieces of data indicated by the k output optical signals, reference may be made to the foregoing related descriptions of the post processing module 15. Details are not described herein again.

For example, for the k output optical signals B(1, 1), . . . , B(m, 1), . . . , B(1, n), . . . , and B(m, n) that are output in S103, the k pieces of data determined by the post processing module 15 based on the k output optical signals may be represented as J(1, 1), . . . , J(m, 1), . . . , J(1, n), . . . , and J(m, n).

Then, optionally, the post processing module 15 may convert the group of one-dimensional data including the determined k pieces of data into the target two-dimensional data according to a second preset rule by using a computing submodule 152. The second preset rule is a rule inverse to the first preset rule.

In an implementation, if the first preset rule is to expand the to-be-transformed two-dimensional data including the m×n pieces of data into one group of one-dimensional data by row, the second preset rule is to convert, by row, the one-dimensional data including the k pieces of data determined based on the k output optical signals into the target two-dimensional data including the m×n pieces of data.

For the one-dimensional data including the k pieces of data determined based on the k output optical signals, the post processing module 15 may divide the one-dimensional data into n data segments, so that each data segment includes m pieces of data. Then, the post processing module 15 may sequentially use the n data segments as n rows of data in the target two-dimensional data based on a sequence of the data segments in the one-dimensional data.

Alternatively, this may be simply understood as follows: The post processing module 15 may use, as the first row of data in the target two-dimensional data, the first m pieces of data in the one-dimensional data including the k pieces of data determined based on the k output optical signals, then use, as the second row of data in the target two-dimensional data, m pieces of data following the first m pieces of data, . . . , and use, as the last row (that is, the $n^{th}$ row) of data in the target two-dimensional data, the last m pieces of data in the k pieces of data determined based on the k output optical signals.

For example, for the one-dimensional data [J(1, 1), . . . , J(m, 1), . . . , J(1, n), . . . , J(m, n)] including the k pieces of data determined by the post processing module 15 based on the k output optical signals, the post processing module 15 may use the first m pieces of data [J(1, 1), . . . , J(m, 1)] in the k pieces of data as the first row of data in the target data, . . . , and use the last m pieces of data [J(1, n), . . . , J(m, n)] in the k pieces of data as the last row (that is, the $n^{th}$ row) of data in the target two-dimensional data. Therefore, the target two-dimensional data may be represented as the following matrix (2):

$$\begin{bmatrix} J(1,1) & \ldots & J(m,1) \\ \vdots & \ldots & \vdots \\ J(1,n) & \ldots & J(m,n) \end{bmatrix} \qquad \text{Matrix (2)}$$

In another implementation, if the first preset rule is to expand the to-be-transformed two-dimensional data including the m×n pieces of data into one group of one-dimensional data by column, the second preset rule is to convert, by column, the one-dimensional data including the k pieces of data determined based on the k output optical signals into the target two-dimensional data including the m×n pieces of data.

For the one-dimensional data including the k pieces of data determined based on the k output optical signals, the post processing module 15 may divide the one-dimensional data into m data segments, so that each data segment includes n pieces of data. Then, the post processing module 15 may sequentially use the m data segments as m columns of data in the target two-dimensional data based on a sequence of the data segments in the one-dimensional data.

Alternatively, this may be simply understood as follows: The post processing module 15 may use, as the first column of data in the target two-dimensional data, the first n pieces of data in the one-dimensional data including the k pieces of data determined based on the k output optical signals, then use, as the second column of data in the target two-dimensional data, n pieces of data following the first n pieces of data, . . . , and use, as the last column (that is, the $m^{th}$ column) of data in the target two-dimensional data, the last n pieces of data in the k pieces of data determined based on the k output optical signals.

For example, a value of k is 6, a value of m is 3, and a value of n is 2. In this case, if the one-dimensional data including the six pieces of data determined by the post processing module 15 based on the six output optical signals is [J(1, 1), J(1, 2), J(2, 1), J(2, 2), J(3, 1), J(3, 2)], the post processing module 15 may use the first two pieces of data [J(1, 1), J(1, 2)] in the six pieces of data as the first column of data in the target data, use two pieces of data [J(2, 1), J(2, 2)] following the first two pieces of data as the second column of data, and use the last two pieces of data [J(3, 1), J(3, 2)] in the k pieces of data as the last column (that is, the third column) of data in the target two-dimensional data. Therefore, the target two-dimensional data may be represented as the following matrix (3):

$$\begin{bmatrix} J(1,1) & J(2,1) & J(3,1) \\ J(1,2) & J(2,2) & J(3,2) \end{bmatrix} \quad \text{Matrix (3)}$$

In this way, according to this embodiment of this application, two-dimensional Fourier transform of the two-dimensional data can be implemented by performing the method described in S101 to S104. Because both the beam splitting phase shift module and the beam combination module for implementing the method are hardware structures deployed on an optical chip, the method provided in this embodiment of this application fills a gap in implementing two-dimensional Fourier transform by using an on-chip structure. In addition, because the beam splitting phase shift module and the beam combination module are optical-in optical-out structures, the method provided in this embodiment of this application improves Fourier transform efficiency.

For clearer understanding of the method provided in embodiments of this application, the following uses examples to describe the method provided in embodiments of this application.

Figure 9:
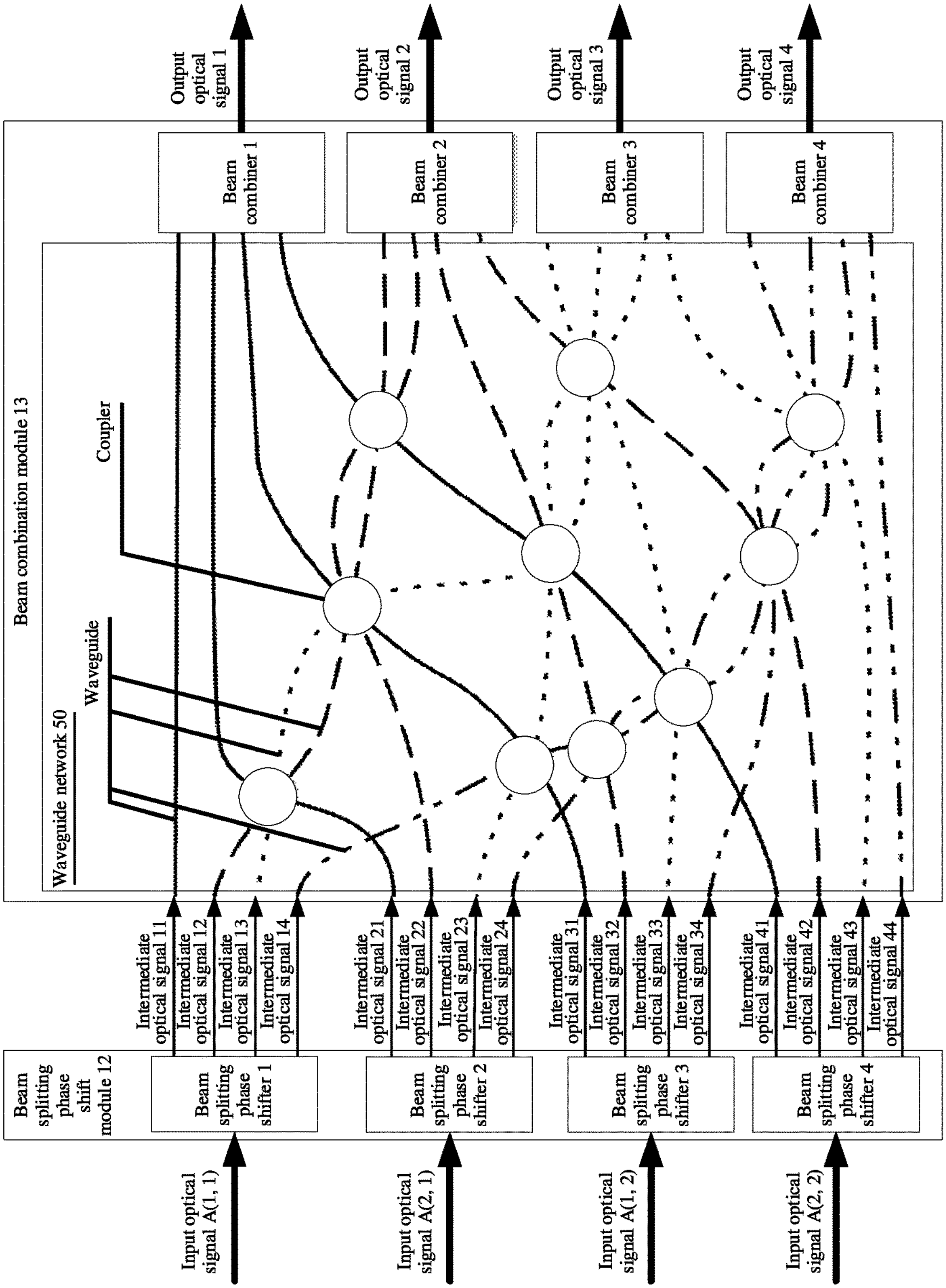
FIG. 9 is a diagram of an optical computing method according to an embodiment of this application.

FIG. 9 is a diagram of an optical computing method according to an embodiment of this application. For example, to-be-transformed two-dimensional data is two-dimensional data whose size is 2×2, that is, values of m and n are both 2, and therefore, a value of k is 4. In this case, the to-be-transformed two-dimensional data may be represented as the following matrix (4):

$$\begin{bmatrix} D(1,1) & D(2,1) \\ D(1,2) & D(2,2) \end{bmatrix} \quad \text{Matrix (4)}$$

A computing submodule 141 in a preprocessing module 14 may expand (for example, expand by row), according to a first preset rule, the to-be-transformed two-dimensional data including four pieces of data into one group of one-dimensional data including four pieces of data: [D(1, 1), D(2, 1), D(1, 2), D(2, 2)].

Then, an electrical-to-optical conversion submodule 142 in the preprocessing module 14 generates four input optical signals A(1, 1), A(2, 1), A(1, 2), and A(2, 2) according to the foregoing predefined rule and based on the one-dimensional data [D(1, 1), D(2, 1), D(1, 2), D(2, 2)] including the four pieces of data. The input optical signal A(1, 1) may indicate the data D(1, 1), the input optical signal A(2, 1) may indicate the data D(2, 1), the input optical signal A(1, 2) may indicate the data D(1, 2), and the input optical signal A(2, 2) may indicate the data D(2, 2).

Then, each of four beam splitting phase shifters in a beam splitting phase shift module 12 receives one input optical signal. As shown in FIG. 9, a beam splitting phase shifter 1 receives the input optical signal A(1, 1), a beam splitting phase shifter 2 receives the input optical signal A(2, 1), a beam splitting phase shifter 3 receives the input optical signal A(1, 2), and a beam splitting phase shifter 4 receives the input optical signal A(2, 2).

After performing beam splitting and phase shift processing on the input optical signal A(1, 1), the beam splitting phase shifter 1 may output an intermediate optical signal 11 through an output port whose port number is (1, 1), output an intermediate optical signal 12 through an output port whose port number is (2, 1), output an intermediate optical signal 13 through an output port whose port number is (1, 2), and output an intermediate optical signal 14 through an output port whose port number is (2, 2).

After performing beam splitting and phase shift processing on the input optical signal A(2, 1), the beam splitting phase shifter 2 may output an intermediate optical signal 21 through an output port whose port number is (1, 1), output an intermediate optical signal 22 through an output port whose port number is (2, 1), output an intermediate optical signal 23 through an output port whose port number is (1, 2), and output an intermediate optical signal 24 through an output port whose port number is (2, 2).

After performing beam splitting and phase shift processing on the input optical signal A(1, 2), the beam splitting phase shifter 3 may output an intermediate optical signal 31 through an output port whose port number is (1, 1), output an intermediate optical signal 32 through an output port whose port number is (2, 1), output an intermediate optical signal 33 through an output port whose port number is (1, 2), and output an intermediate optical signal 34 through an output port whose port number is (2, 2).

After performing beam splitting and phase shift processing on the input optical signal A(2, 2), the beam splitting phase shifter 4 may output an intermediate optical signal 41 through an output port whose port number is (1, 1), output an intermediate optical signal 42 through an output port whose port number is (2, 1), output an intermediate optical signal 43 through an output port whose port number is (1, 2), and output an intermediate optical signal 44 through an output port whose port number is (2, 2).

Then, a beam combination module 13 may combine intermediate optical signals output from output ports with a same port number in the four beam splitting phase shifters in the beam splitting phase shift module 12 into one output optical signal, and output the output optical signal.

As shown in FIG. 9, the beam combination module 13 may combine the four intermediate optical signals output from the output ports whose port numbers are (1, 1) in the four beam splitting phase shifters into an output optical signal 1, and output the output optical signal 1. The four intermediate optical signals include the intermediate optical signal 11 output by the beam splitting phase shifter 1, the intermediate optical signal 21 output by the beam splitting phase shifter 2, the intermediate optical signal 31 output by the beam splitting phase shifter 3, and the intermediate optical signal 41 output by the beam splitting phase shifter 4.

Likewise, the beam combination module 13 may combine the four intermediate optical signals output from the output ports whose port numbers are (2, 1) in the four beam splitting phase shifters into an output optical signal 2, and output the output optical signal 2. The four intermediate optical signals include the intermediate optical signal 12 output by the beam splitting phase shifter 1, the intermediate optical signal 22 output by the beam splitting phase shifter 2, the intermediate optical signal 32 output by the beam splitting phase shifter 3, and the intermediate optical signal 42 output by the beam splitting phase shifter 4.

Likewise, the beam combination module 13 may combine the four intermediate optical signals output from the output ports whose port numbers are (1, 2) in the four beam splitting phase shifters into an output optical signal 3, and output the output optical signal 3. The four intermediate optical signals include the intermediate optical signal 13 output by the beam splitting phase shifter 1, the intermediate optical signal 23 output by the beam splitting phase shifter 2, the intermediate optical signal 33 output by the beam splitting phase shifter 3, and the intermediate optical signal 43 output by the beam splitting phase shifter 4.

Likewise, the beam combination module 13 may combine the four intermediate optical signals output from the output ports whose port numbers are (2, 2) in the four beam splitting phase shifters into an output optical signal 4, and output the output optical signal 4. The four intermediate optical signals include the intermediate optical signal 14 output by the beam splitting phase shifter 1, the intermediate optical signal 24 output by the beam splitting phase shifter 2, the intermediate optical signal 34 output by the beam splitting phase shifter 3, and the intermediate optical signal 44 output by the beam splitting phase shifter 4.

Then, a post processing module 15 may determine, based on the four output optical signals received from the beam combination module 13, four pieces of data indicated by the four output optical signals. The four pieces of data may constitute one group of one-dimensional data. The one-dimensional data may be, for example, [J(1, 1), J(2, 1), J(1, 2), J(2, 2)].

Then, the post processing module 15 may convert (for example, convert by row) the group of one-dimensional data including the four pieces of data into target two-dimensional data according to a second preset rule. That is, the post processing module 15 may use the first two pieces of data in the four pieces of data as the first row of data in the target two-dimensional data, and use the last two pieces of data in the four pieces of data as the second row (that is, the last row) of data in the target two-dimensional data. Therefore, the target two-dimensional data may be represented as the following matrix (5):

$$\begin{bmatrix} J(1,1) & J(2,1) \\ J(1,2) & J(2,2) \end{bmatrix} \quad \text{Matrix (5)}$$

It can be understood that the target two-dimensional data represented by the matrix (5) is two-dimensional data obtained by performing, according to the method provided in embodiments of this application, two-dimensional Fourier transform on the to-be-transformed two-dimensional data represented by the foregoing matrix (4).

To sum up, with the optical computing apparatus and method that are used for performing two-dimensional Fourier transform on two-dimensional data and that are provided in embodiments of this application, two-dimensional Fourier transform of two-dimensional data can be implemented by an on-chip structure on an optical chip. In other words, the apparatus and method provided in embodiments of this application fill a gap in implementing two-dimensional Fourier transform of data by using an on-chip structure. In addition, because the optical computing apparatus for performing two-dimensional Fourier transform provided in embodiments of this application is an optical-in optical-out structure, the apparatus and method provided in embodiments of this application improve efficiency of two-dimensional Fourier transform of data.

The foregoing descriptions are merely implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An optical computing apparatus, comprising:

a beam splitting phase shift circuit configured to receive a plurality of input optical signals that indicate input data, and output a plurality of groups of intermediate optical signals based on the plurality of input optical signals, wherein each input optical signal is used to obtain one group of intermediate optical signals in the plurality of groups of intermediate optical signals, the input data comprises a plurality of elements, and one input optical signal of the plurality of input optical signals indicates one element in the input data; and a beam combination circuit configured to receive the plurality of groups of intermediate optical signals and obtain a plurality of output optical signals based on the plurality of groups of intermediate optical signals, each output optical signal of the plurality of output optical signals comprises one intermediate optical signal in each of the plurality of groups of intermediate optical signals, and output data indicated by the plurality of output optical signals is obtained through two-dimensional Fourier transform performed on the input data.

2. The optical computing apparatus according to claim 1, wherein the input data comprises two-dimensional data.

3. The optical computing apparatus according to claim 1, wherein:

the beam splitting phase shift circuit comprises a plurality of beam splitting phase shifters, each beam splitting phase shifter of the plurality of beam splitting phase shifters is configured to receive one input optical signal and output one group of intermediate optical signals in the plurality of groups of intermediate optical signals based on the received input optical signal, the each beam splitting phase shifter comprises a plurality of output ports, and each output port is configured to output one intermediate optical signal; and the beam combination circuit is configured to receive the plurality of groups of intermediate optical signals from the plurality of beam splitting phase shifters, and combine intermediate optical signals output from the plurality of output ports with a same port number in the plurality of beam splitting phase shifters into one output optical signal, to obtain the plurality of output optical signals.

4. The optical computing apparatus according to claim 3, wherein:

each beam splitting phase shifter is configured to receive one input optical signal, split the received input optical signal into one group of optical sub-signals, and adjust a phase of each optical sub-signal in the group of optical sub-signals to obtain the group of intermediate optical signals.

5. The optical computing apparatus according to claim 3, wherein each beam splitting phase shifter comprises:

a beam splitter configured to split the received input optical signal into the group of optical sub-signals; and a plurality of phase shifters configured to adjust the phase of each optical sub-signal in the group of optical sub-signals, to obtain the group of intermediate optical signals.

6. The optical computing apparatus according to claim 5, wherein:

a phase offset used for phase adjustment of the optical sub-signal by each of the plurality of phase shifters satisfies a formula $\psi(x,y,u,v)=\exp(i\cdot 2\pi(ux/m++vy/n)$, wherein $\psi$ represents the phase offset, a combination of x and y represents a number of the beam splitting phase shifter, numbers of the plurality of beam splitting phase shifters correspond to location numbers of a plurality of elements in the two-dimensional data, a combination of u and v represents a port number of an output port of the beam splitting phase shifter, each beam splitting phase shifter comprises a plurality of output ports, values of x and u are integers in a range [1, m], values of y and v are integers in a range [1, n], both m and n are positive integers greater than 1, and i is an imaginary number symbol.

7. The optical computing apparatus according to claim 5, wherein the beam splitter comprises any one of an optical waveguide furcation structure, a grating structure, or a directional coupler structure.

8. The optical computing apparatus according to claim 5, wherein each phase shifter of the plurality of phase shifters comprises a waveguide.

9. The optical computing apparatus according to claim 3, wherein each beam splitting phase shifter comprises a diffraction structure, and a structural parameter of the diffraction structure is obtained through iterative training of a simulation system.

10. The optical computing apparatus according to claim 1, wherein the beam combination module comprises a three-dimensional waveguide connection structure or a waveguide network on a two-dimensional plane, and a connection at a crosspoint of waveguides in the waveguide network is implemented by using a coupler.

* * * * *